US011505262B2

(12) United States Patent
Reardon

(10) Patent No.: US 11,505,262 B2
(45) Date of Patent: Nov. 22, 2022

(54) TRAILER

(71) Applicant: Anthony Reardon, Brisbane (AU)

(72) Inventor: Anthony Reardon, Brisbane (AU)

( * ) Notice: Subject to any disclaimer, the term of this patent is extended or adjusted under 35 U.S.C. 154(b) by 265 days.

(21) Appl. No.: 16/765,528

(22) PCT Filed: Nov. 13, 2018

(86) PCT No.: PCT/AU2018/051211
§ 371 (c)(1),
(2) Date: May 20, 2020

(87) PCT Pub. No.: WO2019/100105
PCT Pub. Date: May 31, 2019

(65) Prior Publication Data
US 2020/0307722 A1    Oct. 1, 2020

(30) Foreign Application Priority Data

Nov. 21, 2017   (AU) ................................ 2017904704

(51) Int. Cl.
| | |
|---|---|
| *B62D 33/02* | (2006.01) |
| *B62D 21/20* | (2006.01) |
| *B62D 25/20* | (2006.01) |
| *B62D 29/00* | (2006.01) |
| *B62D 33/04* | (2006.01) |
| *B62D 27/02* | (2006.01) |
| *B62D 63/06* | (2006.01) |

(52) U.S. Cl.
CPC .......... *B62D 33/044* (2013.01); *B62D 21/20* (2013.01); *B62D 27/026* (2013.01); *B62D 29/008* (2013.01); *B62D 63/06* (2013.01); *B60G 2300/04* (2013.01); *B62D 25/2054* (2013.01); *B62D 33/02* (2013.01); *B62D 33/046* (2013.01)

(58) Field of Classification Search
CPC .... B62D 21/20; B62D 33/044; B62D 33/046; B62D 25/2054; B62D 27/026; B62D 29/008; B62D 63/06; B62D 33/02; B60G 2300/04
USPC .......................................... 296/182.1, 184.1
See application file for complete search history.

(56) References Cited

U.S. PATENT DOCUMENTS

| | | | | |
|---|---|---|---|---|
| 4,126,324 A | * | 11/1978 | Browning | ............ B62D 63/061 296/10 |
| 4,222,606 A | | 9/1980 | Brown et al. | |
| 4,758,128 A | * | 7/1988 | Law | ........................ B60P 3/122 52/588.1 |
| 5,185,193 A | * | 2/1993 | Phenicie | ................ F16B 5/0056 428/57 |

(Continued)

FOREIGN PATENT DOCUMENTS

WO    2008019441 A1    2/2008

OTHER PUBLICATIONS

International Search Report and Written Opinion issued in International Application No. PCT/AU2018/051211 dated Feb. 4, 2019; 13 pages.

*Primary Examiner* — Gregory A Blankenship
(74) *Attorney, Agent, or Firm* — Wegman Hessler

(57) ABSTRACT

A trailer having a plurality of elongate floor members, each of the floor members connected to an adjacent floor member to define a floor of the trailer, side wall members attached to opposed sides of the floor, an axle assembly attached to the side wall members, and a tongue assembly attached to the side wall members.

18 Claims, 15 Drawing Sheets

(56) References Cited

U.S. PATENT DOCUMENTS

| | | | | |
|---|---|---|---|---|
| 5,775,711 | A * | 7/1998 | Floe | B62D 63/061 |
| | | | | 280/789 |
| 6,814,397 | B2 * | 11/2004 | Henderson | B62D 33/02 |
| | | | | 296/181.3 |
| 7,014,252 | B2 | 3/2006 | Booher | |
| 7,475,901 | B2 | 1/2009 | Winter et al. | |
| 7,708,299 | B2 * | 5/2010 | Duval | B60P 1/435 |
| | | | | 280/789 |
| 8,177,258 | B2 * | 5/2012 | Williams | B62D 63/062 |
| | | | | 280/789 |
| 2006/0091646 | A1 | 5/2006 | Steins | |
| 2006/0181056 | A1 * | 8/2006 | Weekes | B60P 3/1033 |
| | | | | 280/414.1 |
| 2009/0260305 | A1 | 10/2009 | Haub et al. | |
| 2011/0121610 | A1 * | 5/2011 | Stanton | B62D 27/023 |
| | | | | 428/192 |
| 2011/0204601 | A1 | 8/2011 | Alvarino | |
| 2014/0375080 | A1 * | 12/2014 | Bermes | B60P 7/0807 |
| | | | | 296/186.5 |
| 2018/0354562 | A1 * | 12/2018 | Slaven, Jr. | B62D 29/02 |
| 2020/0307722 | A1 * | 10/2020 | Reardon | B62D 63/06 |
| 2020/0391809 | A1 * | 12/2020 | Urban | B60R 13/01 |

\* cited by examiner

DRAW BAR ed States Patent

TRAILER

CROSS REFERENCE TO RELATED APPLICATION

This application is a national phase of International Patent Application No. PCT/AU2018/051211 filed Nov. 13, 2018, which claims the priority filing benefit of Australian Patent Application No. 2017904704 filed Nov. 21, 2017, which are incorporated herein by reference in their entirety.

FIELD OF INVENTION

The present invention relates to a trailer. Reference will be made in the specification to the use of the invention with respect to a box trailer. The patent specification describes this use but it is by way of example only and the invention is not limited to this use.

BACKGROUND OF THE INVENTION

Utility trailers such as box trailers are used to transport cargo. Box trailers can typically be coupled to a car. Box trailers are made by welding a metal sheet floor to a metal frame. The metal frame extends upwardly from the floor and provides support for the walls of the box trailer.

A problem with metal frames is that they require extensive welding to manufacture the frame and to attach the floor and walls to the frame.

Another problem with welded frames is that the dimensions of a trailer cannot be easily changed if the frame is pre-welded A further problem with steel metal frames is that this adds significant weight to the trailer.

OBJECT OF THE INVENTION

It is an object of the present invention to overcome or at least alleviate one or more of the above mentioned problems with trailers and/or provide the consumer with a useful or commercial choice.

SUMMARY OF THE INVENTION

In one aspect, the present invention broadly resides in a trailer having
a plurality of elongate floor members, each of the floor members connected to an adjacent floor member to define a floor of the trailer;
  side wall members attached to opposed sides of the floor;
  an axle assembly attached to the side wall members; and
  a tongue assembly attached to the side wall members.

The floor members are preferably made from extruded aluminium. Preferably, each of the floor members is connected to an adjacent floor member along a lengthwise edge. Preferably each end of each floor member is attached to one of the side wall members. More preferably, a first end of each floor member is attached to a first one of the side wall members and a second end of each floor member is attached to a second one of the side wall members.

Each of the floor members is preferably connected to an adjacent floor member by an interference fit. In one embodiment, each floor member has a hook portion on each longitudinal side. The hook portion is adapted to connect to a hook portion of an adjacent floor member. In another embodiment, each floor member has a tongue portion or prong portion on one side and a groove portion or hook portion on the opposed side to attach to adjacent floor members. In one embodiment, each of the floor members is additionally glued to an adjacent floor member.

Each floor member preferably has a substantially flat upper surface. Each floor member preferably has a support portion extending downwardly from the upper surface. In one embodiment, each floor member has a substantially hollow rectangular cross section.

In another embodiment, the floor members are attached to a base sheet. The base sheet is preferably made of aluminium. The floor members are preferably glued to the base sheet. The floor members and the base sheet preferably define the floor.

In one embodiment each floor member has an upper surface and an opposed lower surface. Preferably each floor member has a first connection portion and a second connection portion. Preferably, the first connection portion is adapted to connect to a second connection portion of an adjacent floor member. Preferably the second connection portion is adapted to connect to a first connection portion of an adjacent floor member. Preferably the first connection portion and the second connection portion are located adjacent the lower surface. Preferably, the first connection portion is adapted to rotatably connect to a second connection portion of an adjacent floor member. Preferably the second connection portion is adapted to rotatably connect to a first connection portion of an adjacent floor member. Preferably the first connection portion is a male portion. Preferably the second connection portion is a female portion. Preferably each floor member has a third connection portion and a fourth connection portion. Preferably, the third connection portion is adapted to connect to a fourth connection portion of an adjacent floor member. Preferably the fourth connection portion is adapted to connect to a third connection portion of an adjacent floor member. Preferably the third connection portion and the fourth connection portion are located adjacent the upper surface. Preferably the third connection portion includes a ramp portion. Preferably the fourth connection portion includes a ramp portion. Preferably, the first connection portion of each floor member is adapted to connect to a second connection portion of an adjacent floor member. Preferably, when the first connection portion of the floor member is connected to a second connection portion of an adjacent floor member, the floor member is rotatable relative to the adjacent floor member between a first position and a secured position. Preferably in the secured position, the third connection portion of the floor member engages with a fourth connection portion of an adjacent floor member. In an alternate embodiment, the first and second connection portions are located adjacent the upper surface and the third and fourth connection portions are located adjacent the lower surface.

The side wall members are preferably glued to the floor. More preferably the side wall members are glued to end portions of the floor members which define the floor. The side wall members are preferably made from extruded aluminium. Each side wall member preferably has a channel which receives the floor. Each side wall member preferably has a wall portion extending upwardly from the channel. The wall portion preferably has a substantially hollow rectangular cross section. Each side wall member preferably includes an indent or a lip in the channel to define a glue track. The glue track is preferably located on a lower portion of the channel. The glue track preferably retains glue as the floor is glued into the channel of each side wall member.

The axle assembly preferably includes one or more axles. Each axle preferably has at least one wheel attached thereto.

The axle assembly preferably includes one or more suspension assemblies to suspend the one or more axles relative to the side wall member. The axle assembly is preferably bolted to the side walls. In one embodiment, the axle assembly is glued to the side wall members. In another embodiment, the axle assembly is additionally attached to the side wall members by brackets which are glued to the side wall members and glued to the axle assembly. In one embodiment, the side wall members include one or more glue tracks on an external surface. The glue tracks preferably retain glue as the brackets are glued to the side wall members.

The tongue assembly is preferably glued to the side wall members. In one embodiment, the tongue assembly is bolted to the side wall members. In another embodiment a bracket attaches each side wall member to the tongue assembly. Each bracket is preferably glued to a side wall member and to the tongue assembly. The tongue assembly preferably includes two draw bar portions which attach the tongue assembly to the side walls. The draw bar portions are preferably glued to the side wall members. Each draw bar portion preferably includes an indent portion or two opposed lips to define a glue track. The glue track preferably retains glues as the draw bar portions are glued to the side wall members. The indent portion or two opposed lips are preferably located on an upper side of the respective draw bar portion. The tongue assembly preferably includes a coupling to couple the trailer to a vehicle. The coupling is preferably a tow hitch receiver. In one embodiment, the tongue assembly includes a dolly wheel.

The trailer preferably includes a front wall member attached to the floor. The front wall member is preferably attached to a front side of the floor. The front wall member is preferably glued to a front side of the floor. The front wall member is preferably attached to the side wall members. In one embodiment, the front wall member is attached to the side wall members by brackets. Preferably each bracket is glued to one of the side wall members and the front wall member. The front wall member preferably has a channel which receives the floor. Each front wall member preferably includes an indent or a lip in the channel to define a glue track. The glue track is preferably located on a lower portion of the channel. The glue track preferably retains glue as the floor is glued into the channel of the front wall member. The front wall member preferably has a wall portion extending upwardly from the channel. The wall portion preferably has a substantially hollow rectangular cross section. Preferably the front wall member is made from the same aluminium extrusion as the side wall members. The front wall member is preferably attached to the tongue assembly. More preferably the front wall member is glued to the tongue assembly.

The trailer preferably includes a rear wall member attached to the floor. The rear wall member is preferably attached to a rear end of the floor. The rear wall member is preferably glued to a rear end of the floor. The rear wall member is preferably attached to the side wall members. In one embodiment, the rear wall member is attached to the side wall members by brackets. Preferably each bracket is glued to one of the side wall members and the rear wall member. The rear wall member preferably has a channel which receives the floor. Each rear wall member preferably includes an indent or a lip in the channel to define a glue track. The glue track is preferably located on a lower portion of the channel. The glue track preferably retains glue as the floor is glued into the channel of the rear wall member. The rear wall member preferably has a wall portion extending downwardly from the channel. In one embodiment, the wall portion extends upwardly from the channel. The wall portion preferably has a substantially hollow rectangular cross section. Preferably the rear wall member is made from the same aluminium extrusion as the side wall members.

The trailer preferably includes a fender on each side of the trailer to at least partially cover one or more wheels on each side of the trailer. Each fender is preferably attached to a side wall member. In one embodiment, each fender is glued to a side wall member. In one embodiment, each fender is bolted to a side wall member. An advantage of bolting a fender to a side wall member is that in the event of a fender being damaged, the fender can be easily replaced.

In one embodiment, the trailer includes one or more upper wall members. Preferably each upper wall member is attachable to a side wall member or an adjacent upper wall member. Preferably in this manner a side wall member and attached upper wall members define a side wall of the trailer which is higher than just a side wall member by itself. Preferably each upper wall member is attachable to a side wall member, a front wall member, a rear wall member or an adjacent upper wall member. In one embodiment, each upper wall member is adapted to attach to a panel. Preferably each upper wall member has a slot to receive the panel. Preferably in this manner a side wall member, an attached upper wall member and an attached panel define a side wall of the trailer. In another embodiment, each side wall member is adapted to attach to a panel. Preferably each side wall member has a slot to receive the panel. In another embodiment, each front wall member is adapted to attach to a panel. Preferably each front wall member has a slot to receive the panel. In another embodiment, each rear wall member is adapted to attach to a panel. Preferably each rear wall member has a slot to receive the panel.

The glue is preferably suitable for bonding metals. The glue is preferably a two part adhesive. The glue is preferably a Methacrylate adhesive. The glue when cured preferably has a tensile strength of at least 10 MPa. In one embodiment, the glue has a tensile strength of between 12 and 15 MPa. The glue preferably has a tensile modulus of between 200 to 280 MPa. In one embodiment, the glue is in the form of a double sided adhesive tape.

In another aspect, the present invention broadly resides in a trailer having a plurality of elongate floor members, each of the floor members connected to an adjacent floor member to define a floor of the trailer;

side wall members attached to opposed sides of the floor;

an axle assembly attached to each side wall member; and a tongue assembly attached to the side wall members.

In one embodiment, each axle assembly includes at least one stub axle. Preferably each axle assembly includes suspension means. Preferably each axle assembly includes at least one wheel. In one embodiment, each axle assembly includes two stub axles and two wheels.

In a further aspect, the present invention broadly resides in a trailer having a plurality of elongate floor members, each of the floor members connected to an adjacent floor member to define a floor of the trailer;

two side wall members, each side wall member having a channel to receive and attach the floor to the side wall member;

one or more axle assemblies attached to the side wall members; and a tongue assembly attached to the side wall members, wherein the side wall members are glued to the floor.

The side wall members are preferably glued to the tongue assembly. The side wall members are preferably glued to the one or more axle assemblies.

The side wall members are preferably bolted to the tongue assembly. The side wall members are preferably bolted to the one or more axle assemblies.

In another aspect, the present invention broadly resides in a method of manufacturing a trailer, including the steps of
connecting a plurality of floor members together to define a floor of the trailer;
attaching side wall members to opposed sides of the floor;
attaching an axle assembly to the side wall members; and
attaching a tongue assembly to the side wall members.

Preferably the method further includes the step of attaching a front wall member to the floor. Preferably the step of attaching a front wall member to the floor includes receiving the floor in a channel of the front wall member. Preferably the step further includes gluing the floor into the channel of the front wall member.

Preferably the method further includes the step of attaching a rear wall member to the floor. Preferably the step of attaching a rear wall member to the floor includes receiving the floor in a channel of the rear wall member. Preferably the step further includes gluing the floor into the channel of the rear wall member.

Preferably the step of connecting a plurality of floor members together to define a floor of the trailer includes interconnecting hook portions or hook and prong portions of adjacent floor members. Preferably the step of connecting a plurality of floor members together to define a floor of the trailer includes gluing adjacent floor members together.

Preferably the step of attaching side wall members to opposed sides of the floor includes receiving the floor in a channel in each side wall member. Preferably the step further includes gluing the floor into each channel.

Preferably the step of attaching a tongue assembly to the side wall members includes gluing draw bar portions of the tongue assembly to the side wall members.

Preferably the method further includes the step of attaching the tongue assembly to the front wall member.

Preferably the step of an axle assembly to the side wall members includes bolting the axle assembly to the side wall members.

Preferably the method further includes the step of attaching at least one fender to each side wall member.

The features described with respect to one aspect also apply where applicable to all other aspects of the invention. Furthermore, different combinations of described features are herein described and claimed even when not expressly stated.

BRIEF DESCRIPTION OF THE DRAWINGS

In order that the present invention can be more readily understood reference will now be made to the accompanying drawings which illustrate a preferred embodiment of the invention and wherein.

DETAILED DESCRIPTION OF THE PREFERRED EMBODIMENT

Figure 1:
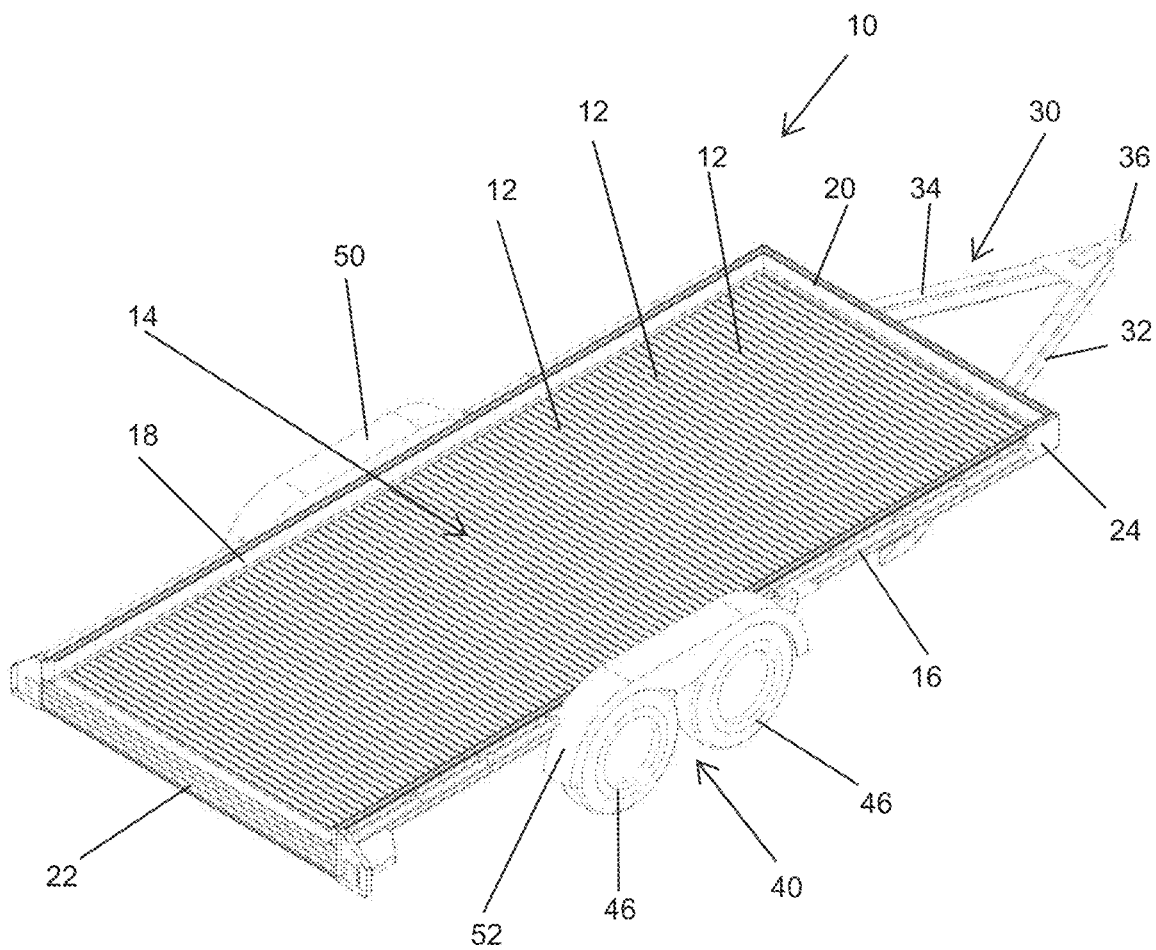
FIG. 1 is a perspective view of a trailer according to an embodiment of the present invention.
Figure 2:
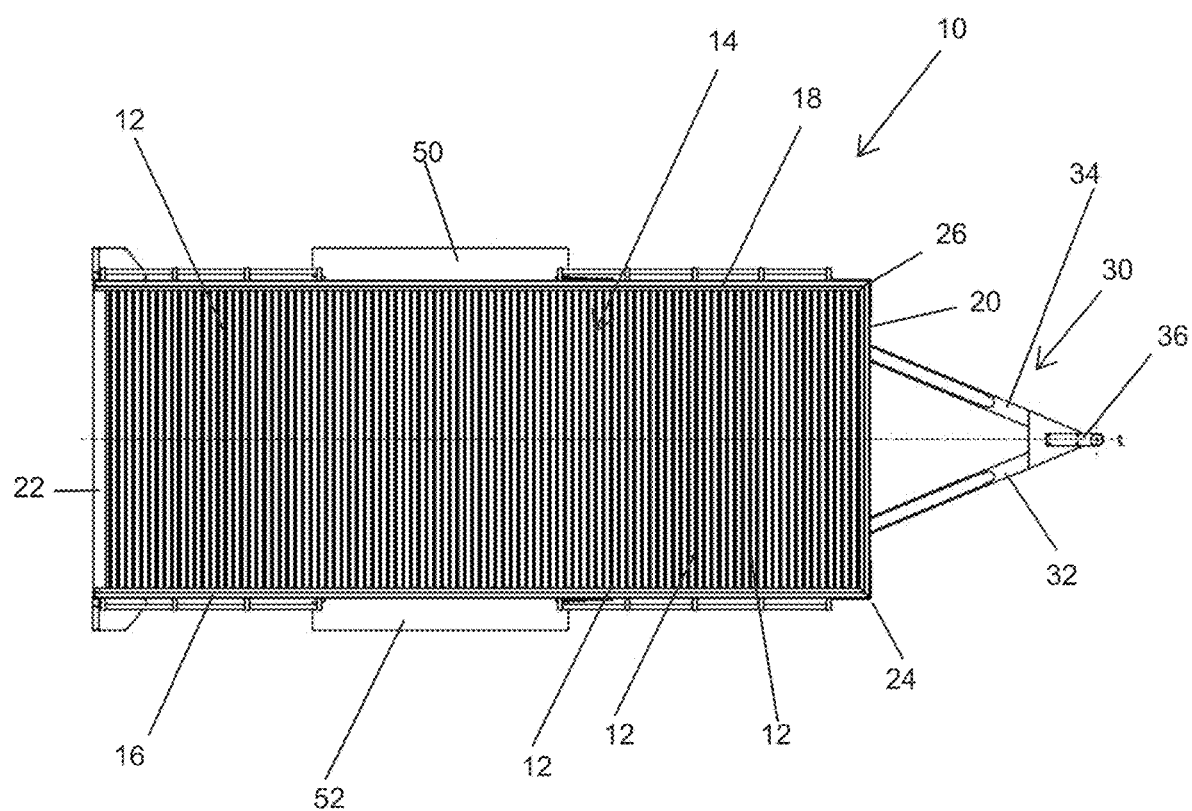
FIG. 2 is a top view of the trailer of FIG. 1.
Figure 3:
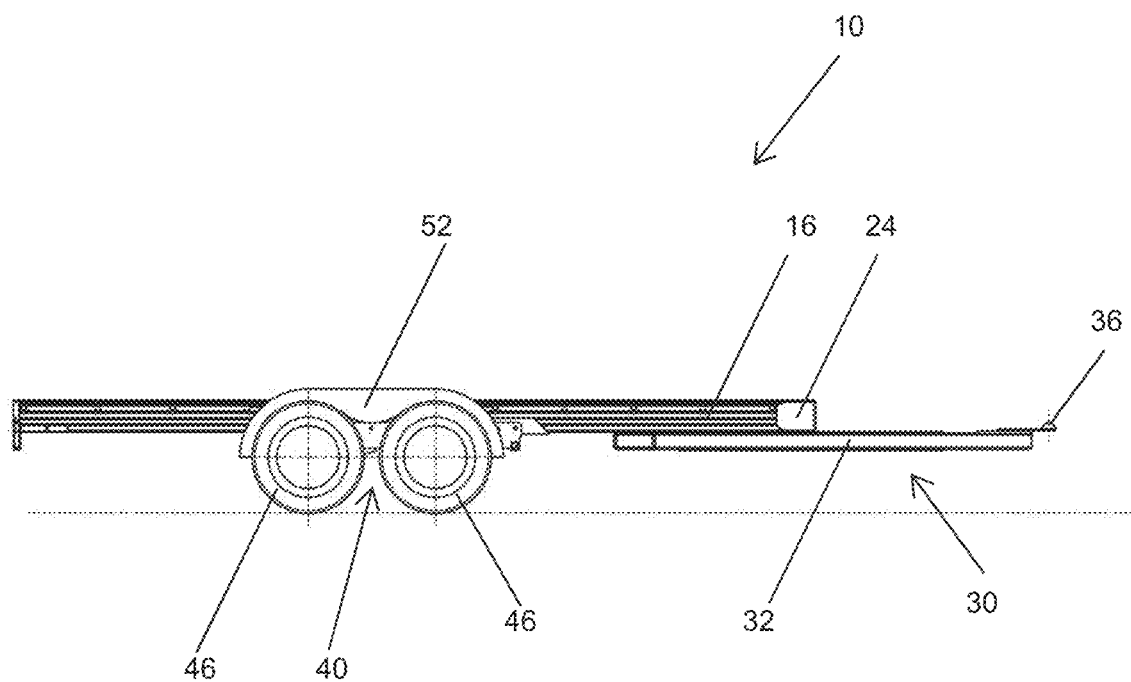
FIG. 3 is a side view of the trailer of FIG. 1.
Figure 4:
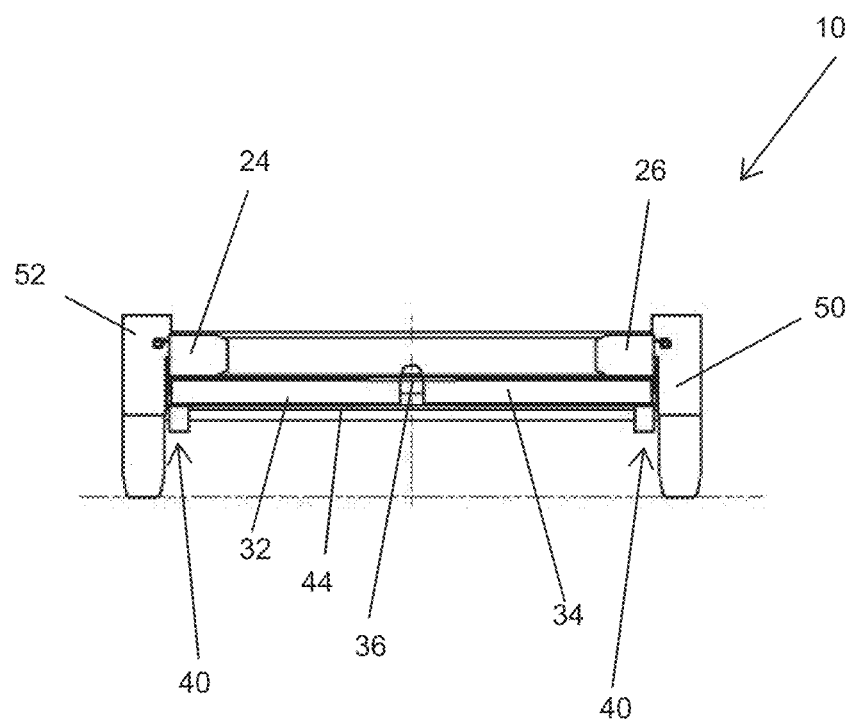
FIG. 4 is a front view of the trailer of FIG. 1.
Figure 5:
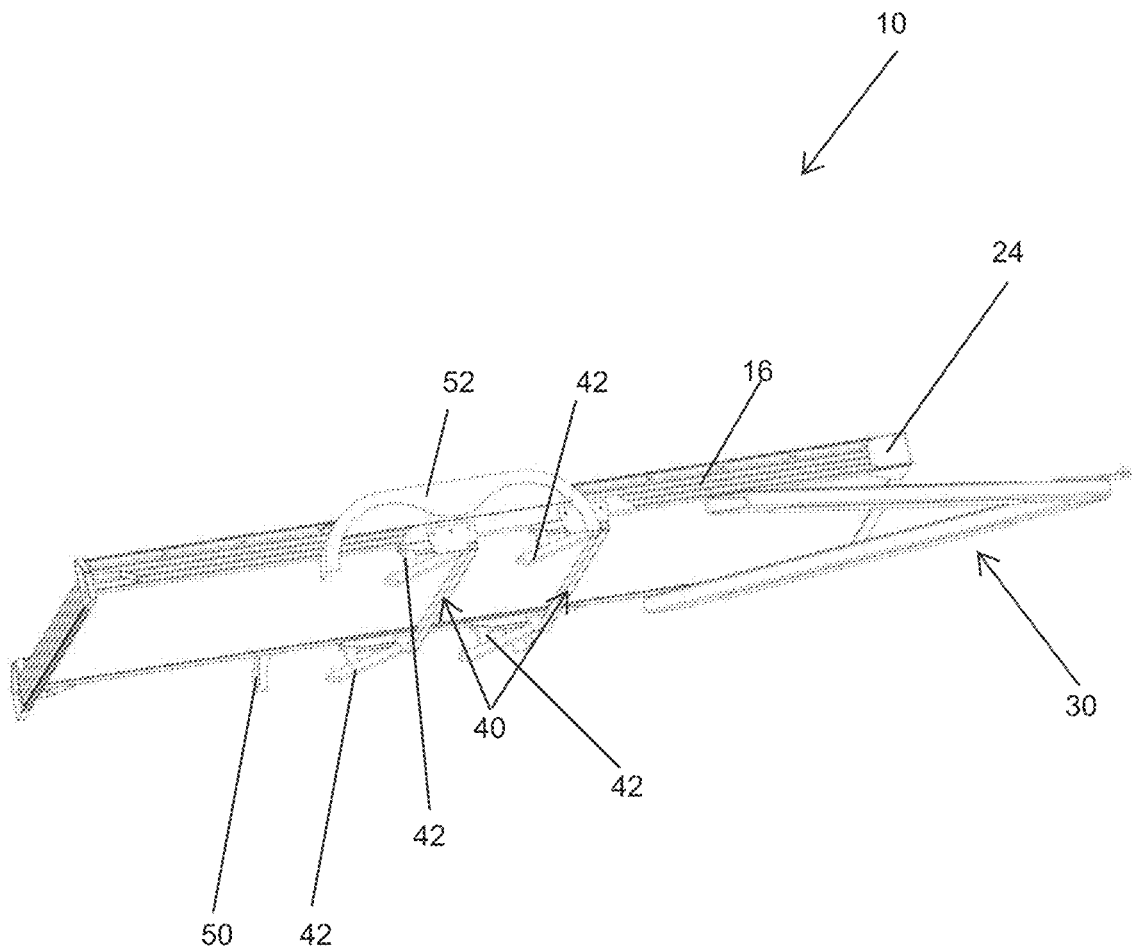
FIG. 5 is a lower perspective view of the trailer of FIG. 1 with the wheels and axles removed for clarity.
Figure 6:
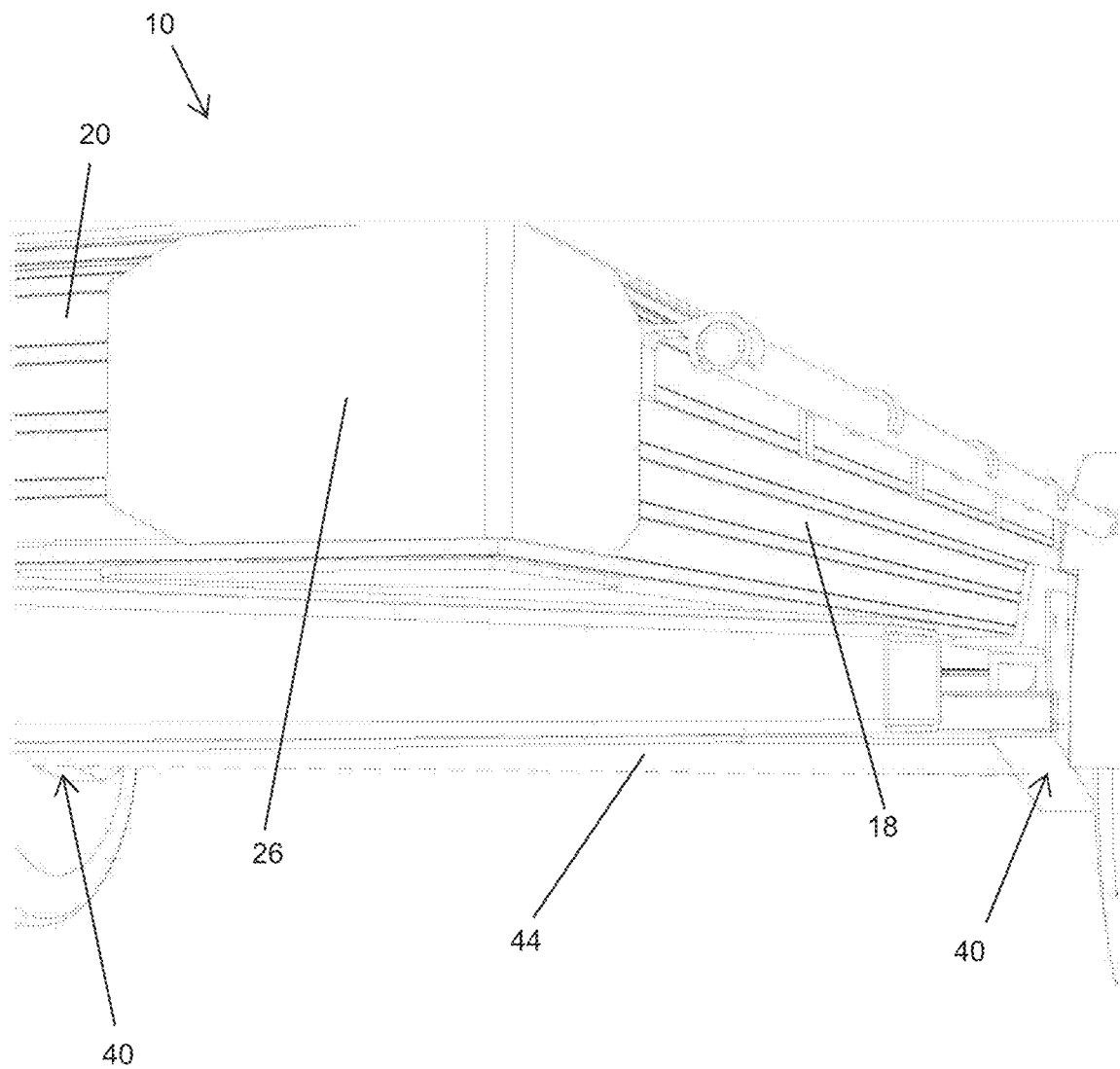
FIG. 6 is a detailed front view of the trailer of FIG. 1.

With reference to FIGS. 1 to 6, there is shown a trailer 10 according to an embodiment of the present invention. The trailer 10 has a plurality of floor members 12 defining a floor 14. The floor members 12 are aluminium extrusion. The floor 14 is glued to side wall members 16,18. The floor 14 is also glued to front wall member 20 and rear wall member 22. The wall members 16,18,20,22 are aluminium extrusion. Wall members 16,18,20,22 are the same type of extrusion, with rear wall member 22 installed upside down compared to wall members 16,18,20.

Side wall members 16,18 are attached to the front wall member 20 by brackets 24,26. Bracket 24 is glued to side wall member 16 and front wall member 20. Bracket 26 is glued to side wall member 18 and front wall member 20.

A tongue assembly 30 is attached to the side wall members 16,18 and the front wall member 20. The tongue assembly has two draw bars 32,34. Draw bar 32 is glued to the side wall member 16 and front wall member 20. Draw bar 34 is glued to the side wall member 18 and front wall member 20. The draw bars 32,34 are aluminium extrusion. In one embodiment (not shown) the draw bars are further attached to the side wall members by brackets which are glued to the corresponding draw bars and side wall members. The tongue assembly also includes a coupling in the form of a tow hitch receiver 36.

An axle assembly 40 is attached to the side wall members 16,18. In this embodiment, the axle assembly 40 is bolted to the side wall members 16,18. The axle assembly 40 includes suspension 42, axles 44 and wheels 46.

Fenders 50 and 52 are bolted to sidewalls 18 and 16 respectively and partially cover the wheels 46.

Figure 7:
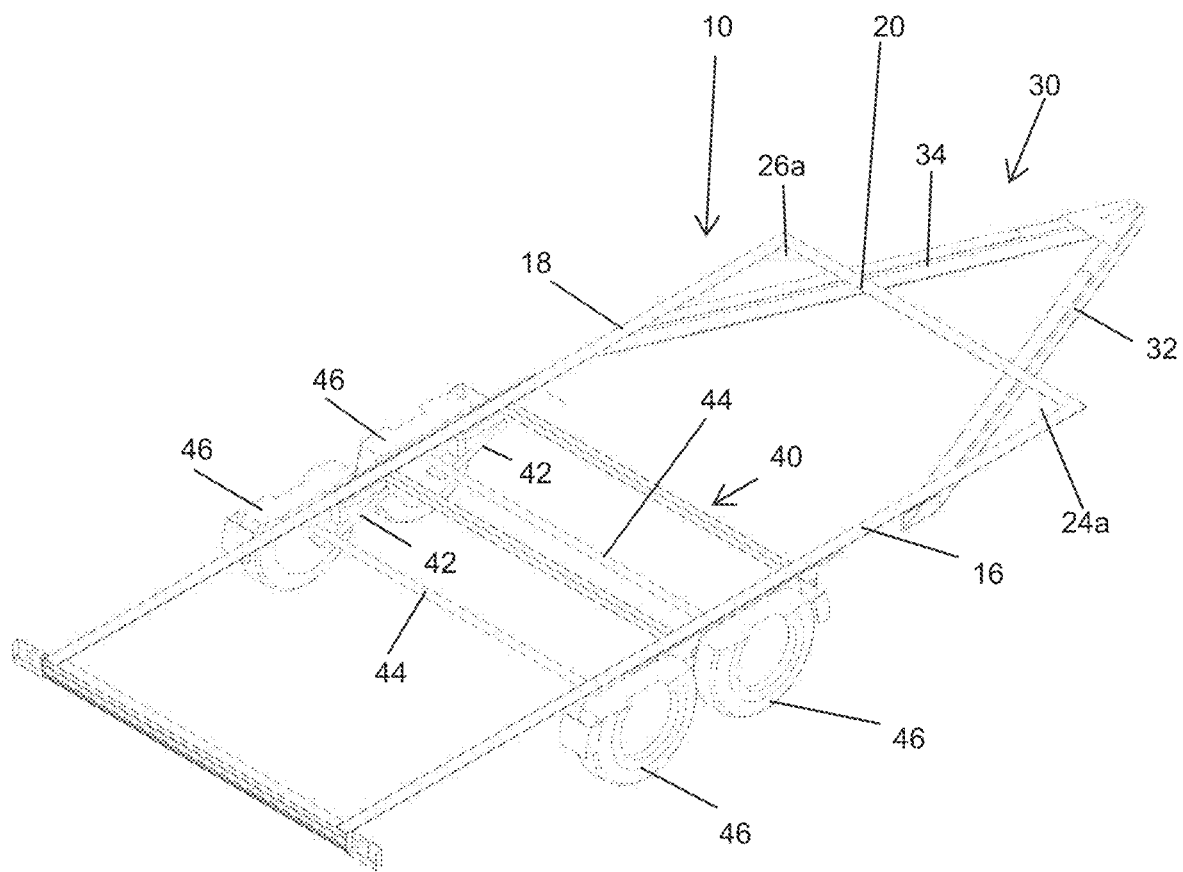
FIG. 7 is a sectioned view of the trailer of FIG. 1.

FIG. 7 is a sectioned view of the trailer 10 showing where the lower portions of the side wall members 16,18 are glued to the draw bars 32,34 of the tongue assembly 30. FIG. 7 also shows where the front wall member 20 is glued to the draw bars 32,34. FIG. 7 also shows the axle assembly 40 in some more detail. Side wall members 16,18 are also further attached to front wall member 20 by gusset members 24a,26a.

Figure 8:
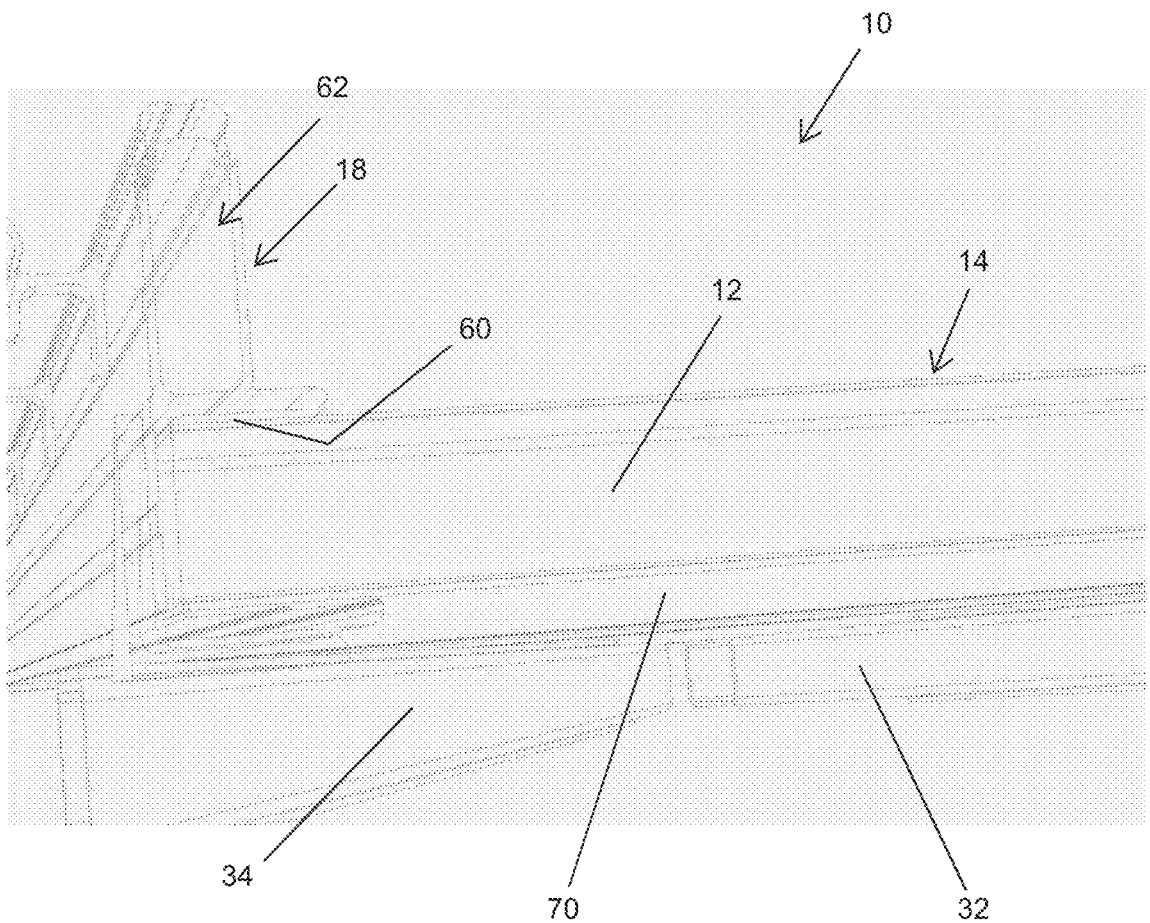
FIG. 8 is a sectioned view of the trailer of FIG. 1.

With reference to FIG. 8, there is shown a detailed cross section of the trailer 10. The side wall member 18 has a channel 60 which receives the floor members 12 of the floor 14. The channel also receives a sheet 70 which is glued to the floor members 12 and is also part of the floor 14. The floor 14 is glued into the channel 60. The side wall member 18 has a wall portion 62 which extends upwardly from the channel 60.

Figure 9:
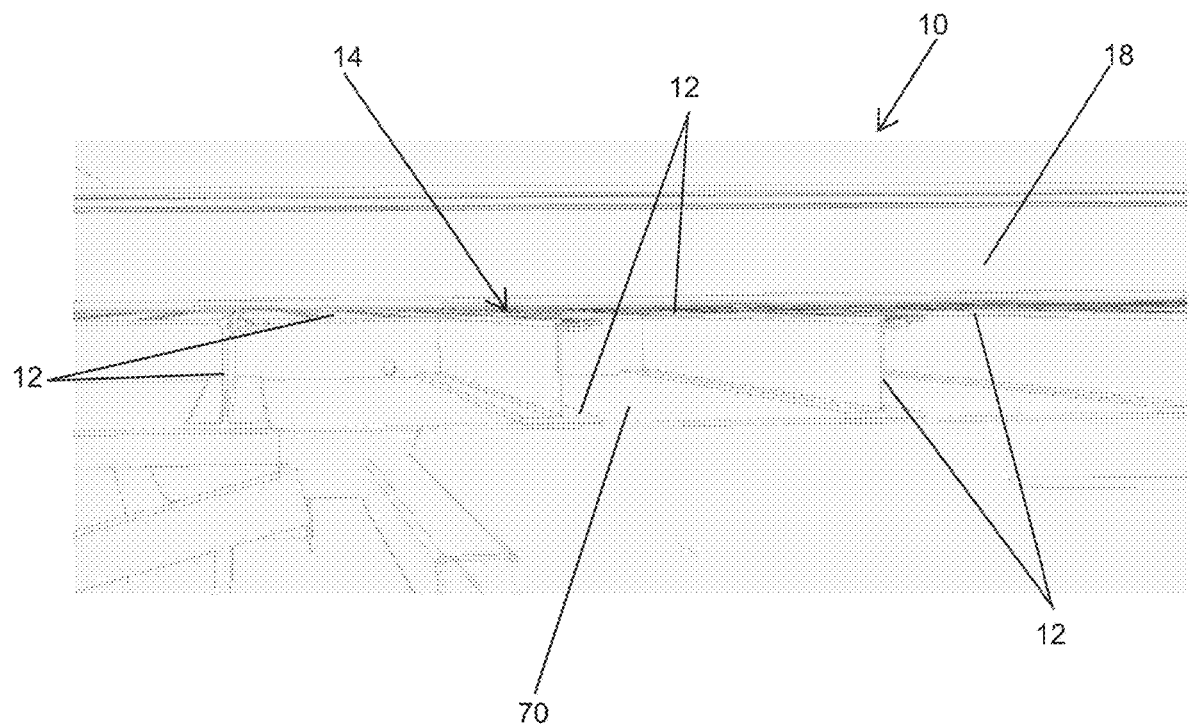
FIG. 9 is a sectioned view of the trailer of FIG. 1.

With reference to FIG. 9, there is shown a detailed sectioned side view of the trailer 10. The floor members 12 are attached to adjacent floor members 12 and are also glued to the aluminium sheet 70 to define the floor 14.

Figure 10:
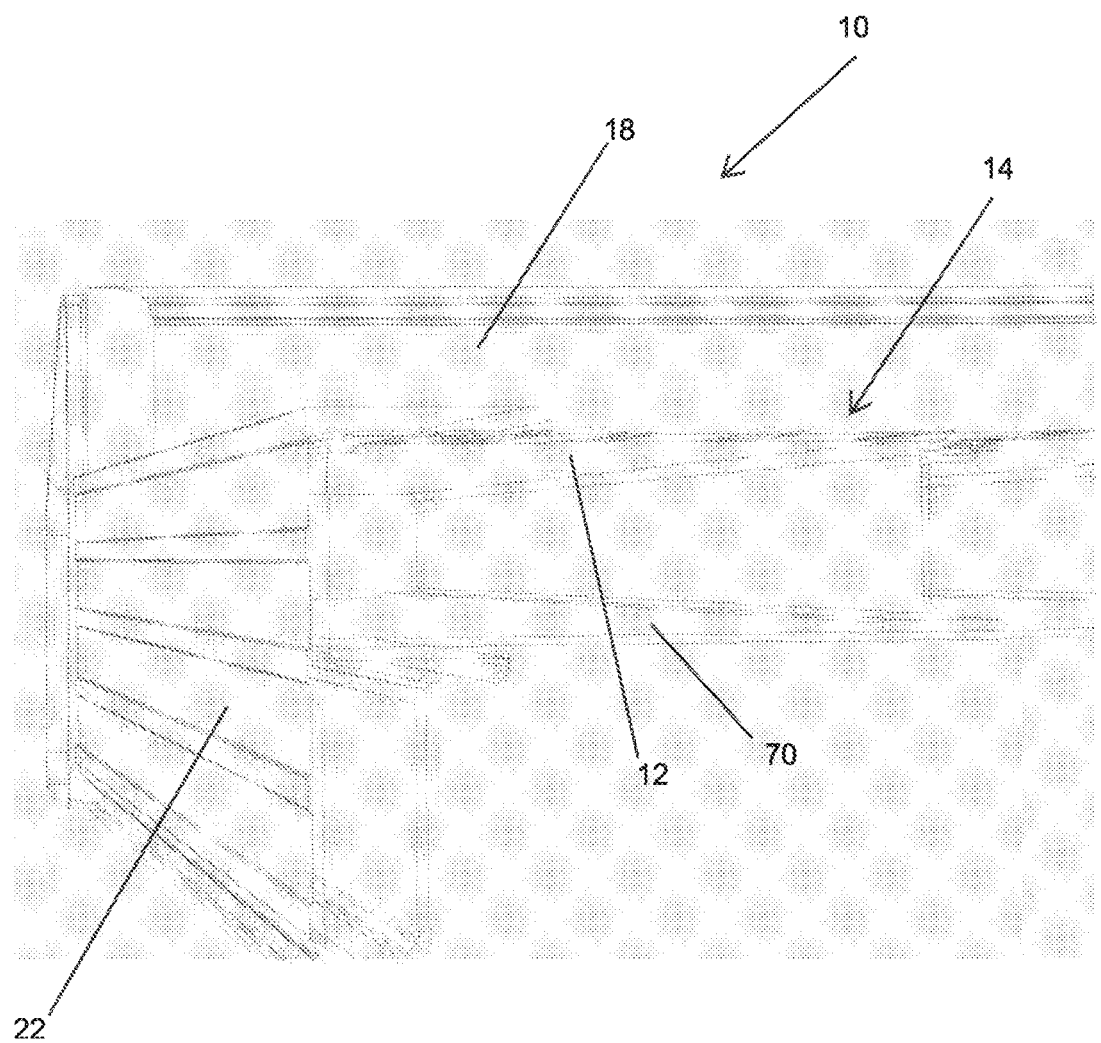
FIG. 10 is a sectioned view of the trailer of FIG. 1.

FIG. 10 shows a detailed sectioned side view of the trailer 10. The rear wall 22 is made of the same extrusion as the other wall members 16,18,20. The rear wall member 22 is attached to the floor 14 in an upside down manner compared to the other wall members 16,18,20.

Figure 11:
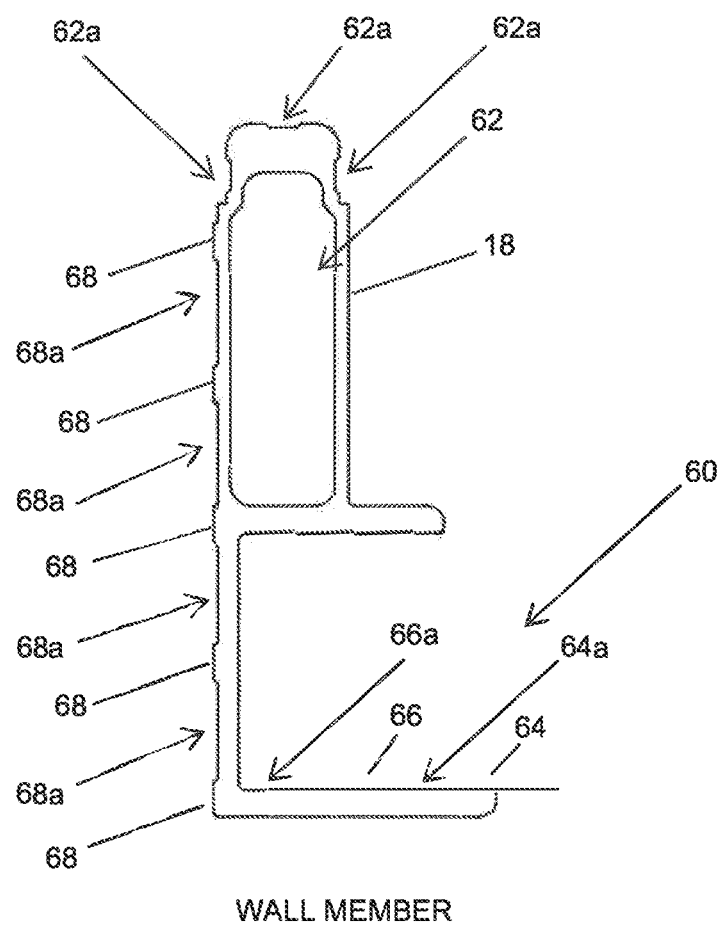
FIG. 11 is a cross section view of a side wall member according to an embodiment of the invention.

With reference to FIG. 11, there is shown a cross section view of the side wall member 18. The channel 60 includes lips 64 and 66 which define glue tracks 64a and 66a. The glue tracks 64a and 66a are used to retain glue as the side wall member 18 is glued to the floor (not shown). The side wall member 18 also has lips 68 which define glue tracks 68a. Glue tracks 68a are used to retain glue as brackets (not shown) are glued onto the side wall member 18. The side wall member 18 also has glue tracks 62a on upper sides and a top portion of the side wall member 18. Glue tracks 62a are used to retain glue as accessories (not shown) are glued to the top of the side wall member 18, for example wall extensions (not shown) which are used if the trailer is used as a horse float.

Figure 12:
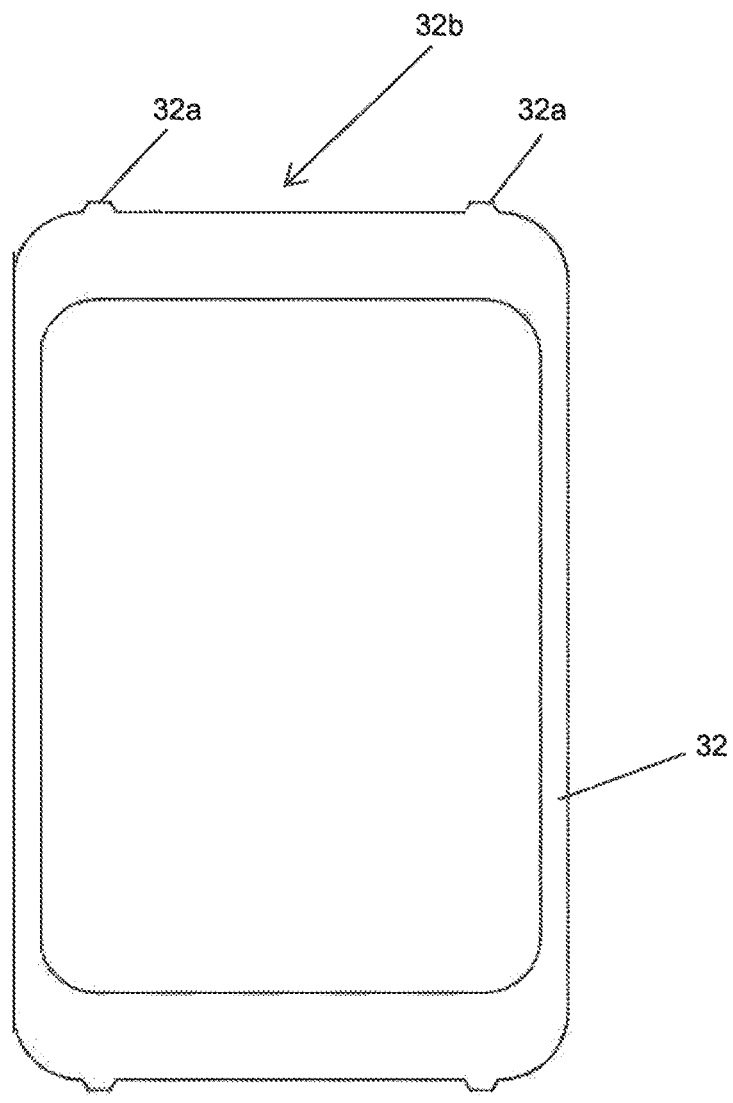
FIG. 12 is a is a sectioned view of a draw bar according to an embodiment of the present invention.

With reference to FIG. 12, there is shown a cross section view of the draw bar 32. The draw bar has lips 32a which define glue track 32b. The glue track 32b is used to retain glue as the side wall member 16 (not shown) and the front wall member 20 (not shown) are glued to the draw bar 32.

Figure 13:
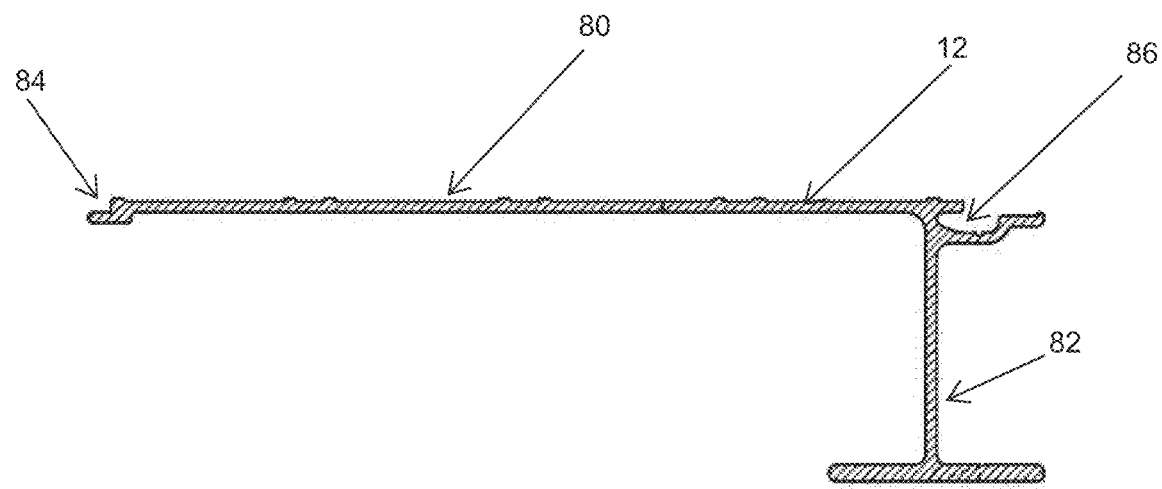
FIG. 13 is a sectioned view of a floor member according to an embodiment of the present invention.

With reference to FIG. 13, there is shown a cross section view of a floor member 12. The floor member 12 has a substantially flat upper surface 80. A support portion 82 extends downwardly from the upper surface 80. When defining a floor (not shown) the support portion 82 is glued to the aluminium sheet 70 (not shown). The floor member 12 has a tongue portion 84 and a groove portion 86 so that adjacent floor members can be connected.

Figure 14:
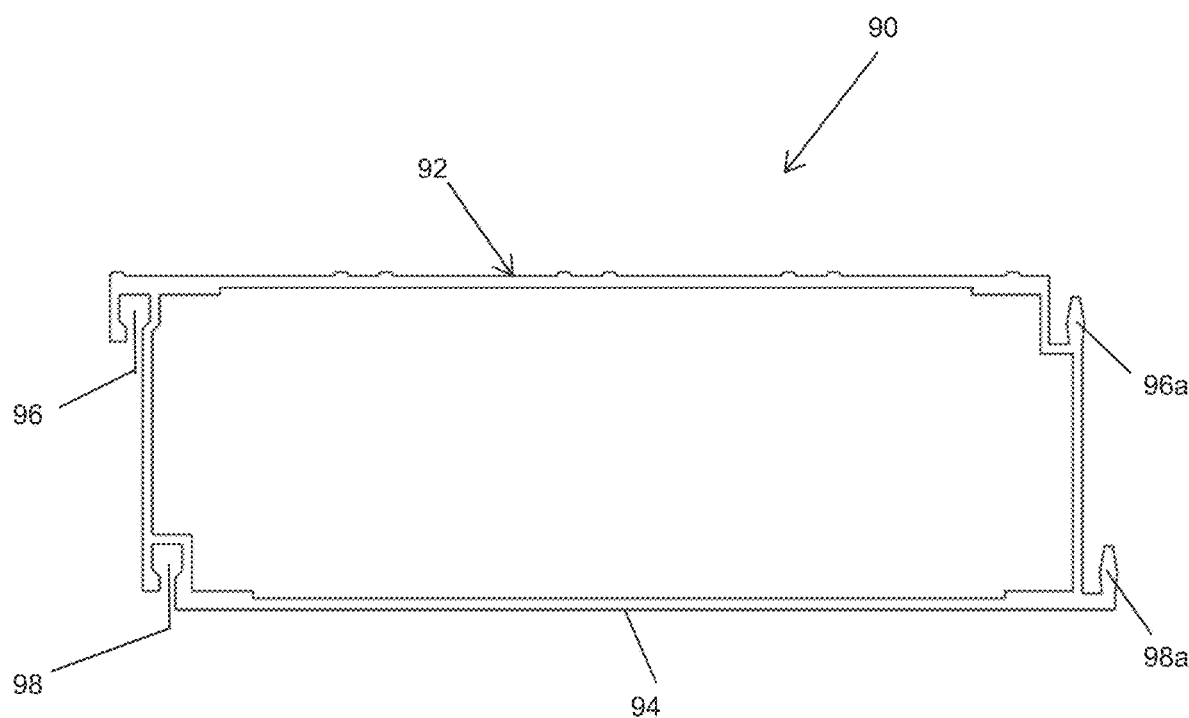
FIG. 14 is a sectioned view of a floor member according to another embodiment of the present invention.

With reference to FIG. 14, there is shown a cross section view of a floor member 90 according to another embodiment of the invention. The floor member 90 has a substantially flat upper surface 92 and a lower surface 94. The floor member 90 also has female portions 96 and 98 and male portions 96a and 98a. The female portions 96,98 engage with male portions (not shown) of an adjacent floor member (not shown). The male portions 96a,98a engage with female portions (not shown) of another adjacent floor member (not shown). In this manner, a plurality of floor members 12 can be connected to define a floor.

Figure 15:
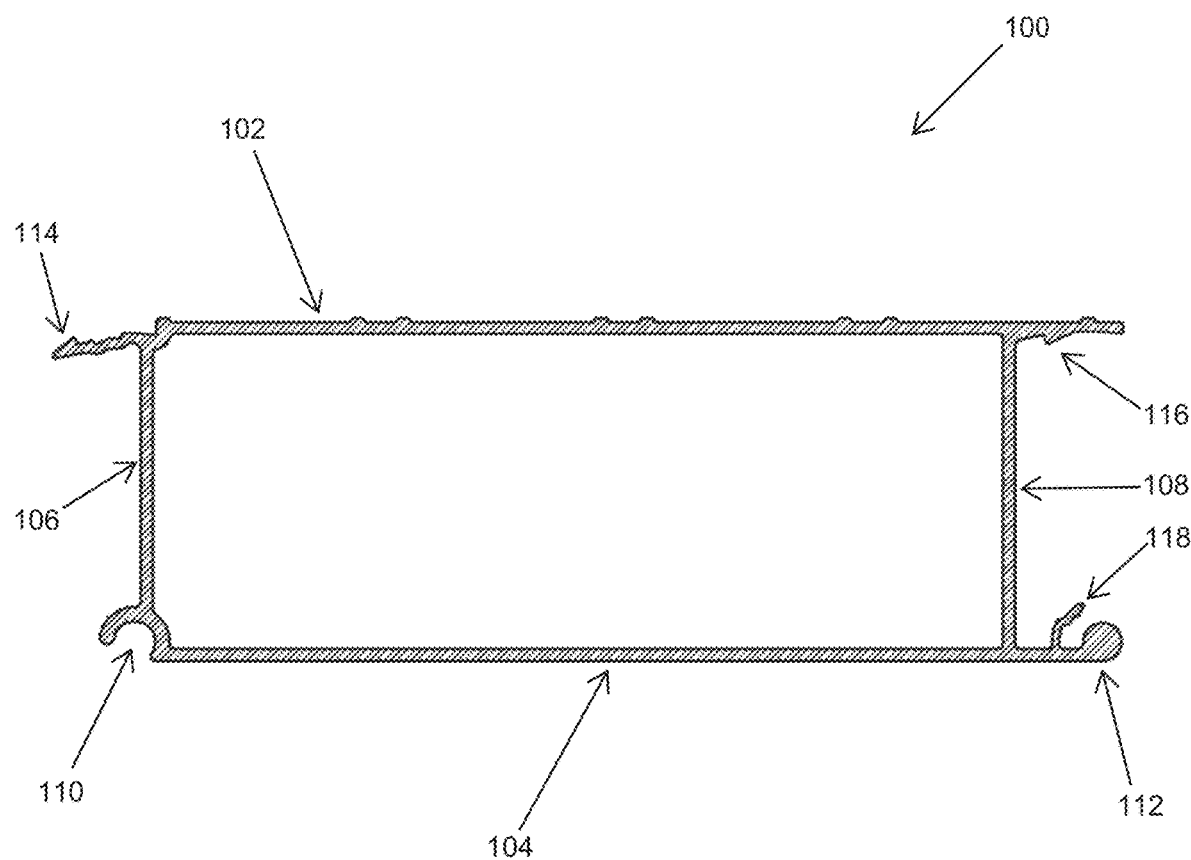
FIG. 15 is a sectioned view of a floor member according to a further embodiment of the present invention.

With reference to FIG. 15, there is shown a cross section view of a floor member 100 (looking from an end in the lengthwise direction of the floor member) according to a further embodiment of the invention. The floor member 100 has a substantially flat upper surface 102 and a lower surface 104. The upper surface 102 is spaced from the lower surface by support walls 106,108. The floor member 100 also has a female portion 110 and a male portion 112. The female portion 110 is adapted to engage with a male portion (not shown) of an adjacent floor member (not shown). The male portion 112 is adapted to engage with a female portion (not shown) of another adjacent floor member (not shown). The male portion 112 has a sheath portion 118. The male portion 112 is adapted to engage with a female portion (not shown) of another adjacent floor member at an angle as can be seen from FIG. 15 due to the sheath portion 118.

The floor member 100 has a first ramp portion 114 and a second ramp portion 116. The first ramp portion 114 is adapted to engage with a second ramp portion of an adjacent floor member (not shown). The second ramp portion 116 is adapted to engage with a first ramp portion of another adjacent floor member (not shown).

In use, the male portion 112 connects with a female portion (not shown) of another adjacent floor member at an angle, the floor member 100 is then rotated relative to the adjacent floor member to a secured position so that the second ramp portion 116 engages with a first ramp portion of the adjacent floor member (not shown) to secure the floor members together. In this manner, a plurality of floor members 100 can be connected to define a floor.

Advantages

An advantage of the preferred embodiment of the trailer includes the ability to manufacture a trailer with no or minimal welding. Another advantage of the preferred embodiment of the trailer includes a lighter construction compared to a welded frame or steel framed trailer. A further advantage of the preferred embodiment of the trailer includes the ability to easily change the dimensions of the trailer by changing the length and/or number of floor members. An additional advantage of the preferred embodiment of the trailer includes faster assembly and reduced costs due to no or minimal welding. A further advantage of the preferred embodiment of the trailer being made from aluminium is that it does not require painting or galvanisation as is typically required for steel framed trailers.

Variations

While the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:
1. A trailer having
   a plurality of elongate floor members, each of the floor members connected to an adjacent floor member to define a floor of the trailer;
   side wall members attached to opposed sides of the floor;
   an axle assembly attached to the side wall members; and
   a tongue assembly attached to the side wall members,
   wherein each of the floor members has a first connection portion, a second connection portion, a third connection portion and a fourth connection portion, wherein the first connection portion is rotationally connected to a second connection portion of an adjacent floor member, the floor member rotated relative to the adjacent floor member from a first position in which the third connection portion is separate from a fourth connection portion of the adjacent floor member to a secured position in which the third connection portion is secured to the fourth connection portion of the adjacent floor member.
2. A trailer as claimed in claim 1, wherein each of the elongate floor members has a first end attached to a first one of the side wall members, and a second end attached to a second one of the side wall members.
3. A trailer as claimed in claim 1, further including a front wall member attached to the floor, the front wall member also being attached to each of the side wall members.
4. A trailer as claimed in claim 3, wherein the front wall member is attached to the tongue assembly.
5. A trailer as claimed in claim 3, wherein each of the elongate floor members extends substantially parallel to the front wall member.

6. A trailer as claimed in claim 1, wherein the tongue assembly includes a coupling to couple the trailer to a vehicle.

7. A trailer as claimed in claim 1, wherein each side wall member has a channel which receives the floor.

8. A trailer as claimed in claim 7, wherein each side wall member has a wall portion extending upwardly from the channel, the wall portion having a substantially hollow rectangular cross section.

9. A trailer as claimed in claim 3, further including a rear wall member attached to the floor.

10. A trailer as claimed in claim 9, wherein the rear wall member has a channel which receives the floor.

11. A trailer as claimed in claim 9, wherein the front wall member, the rear wall member and each of the side wall members have a same profile.

12. A trailer as claimed in claim 1, wherein each side wall member is glued to the floor.

13. A trailer as claimed in claim 1, wherein each of the floor members is made of extruded aluminium, and each of the side walls is made of extruded aluminium.

14. A trailer having
a plurality of elongate floor members, each of the floor members connected to an adjacent floor member to define a floor of the trailer;
two side wall members, each side wall member having a channel to receive and attach the floor to the side wall member;
one or more axle assemblies attached to the side wall members; and
a tongue assembly attached to the side wall members, wherein the side wall members are glued to the floor;
wherein each of the floor members has a first connection portion, a second connection portion, a third connection portion and a fourth connection portion, wherein the first connection portion is rotationally connected to a second connection portion of an adjacent floor member, the floor member rotated relative to the adjacent floor member from a first position in which the third connection portion is separate from a fourth connection portion of the adjacent floor member to a secured position in which the third connection portion is secured to the fourth connection portion of the adjacent floor member.

15. A trailer as claimed in claim 14, wherein each of the elongate floor members has a first end attached to a first one of the side wall members, and a second end attached to a second one of the side wall members.

16. A method of manufacturing a trailer, including the steps of connecting a plurality of floor members together to define a floor of the trailer;
attaching side wall members to opposed sides of the floor;
attaching an axle assembly to the side wall members;
attaching a tongue assembly to the side wall members;
attaching a front wall member to the floor, the step including receiving the floor in a channel of the front wall member and gluing the floor into the channel of the front wall member; and
attaching a rear wall member to the floor, the step including receiving the floor in a channel of the rear wall member and gluing the floor into the channel of the rear wall member.

17. A method as claimed in claim 16, wherein the step of attaching side wall members to opposed sides of the floor includes attaching a first end of each of the plurality of floor members to a first one of the side wall members, and attaching a second end of each of the plurality of floor members to a second one of the side wall members.

18. A method as claimed in claim 16, wherein the step of attaching side wall members to opposed sides of the floor includes receiving the floor in a channel in each side wall member, and gluing the floor into each channel.

* * * * *